United States Patent
Venkatagiri et al.

(10) Patent No.: US 10,379,921 B1
(45) Date of Patent: Aug. 13, 2019

(54) FAULT DETECTION AND POWER RECOVERY AND REDUNDANCY IN A POWER OVER ETHERNET SYSTEM

(71) Applicant: Juniper Networks, Inc., Sunnyvale, CA (US)

(72) Inventors: Madhusudhana Malur Venkatagiri, Bangalore (IN); Harish Reddy Gadige, Bangalore (IN); Anand Vardhan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 32 days.

(21) Appl. No.: 15/812,672

(22) Filed: Nov. 14, 2017

(51) Int. Cl.
| | | |
|---|---|---|
| *H02J 4/00* | (2006.01) | |
| *G06F 11/07* | (2006.01) | |
| *G06F 1/26* | (2006.01) | |
| *H04L 12/10* | (2006.01) | |
| *G06F 1/3234* | (2019.01) | |
| *G06F 1/3209* | (2019.01) | |

(52) U.S. Cl.
CPC .......... *G06F 11/0709* (2013.01); *G06F 1/266* (2013.01); *G06F 1/3209* (2013.01); *G06F 1/3243* (2013.01); *H04L 12/10* (2013.01)

(58) Field of Classification Search
CPC ....... H04L 12/10; H04L 1/22; H04L 41/0668; H04L 67/125; H04L 69/40; H02H 3/08; H02H 3/20; H02H 7/261; H02H 3/38; H02H 3/05; H02J 4/00; H02J 13/0006; H02J 2003/007; H02J 2007/004
See application file for complete search history.

(56) References Cited

U.S. PATENT DOCUMENTS

| | | | | |
|---|---|---|---|---|
| 6,987,331 B2* | 1/2006 | Koeppe | ............. | H02J 3/185 307/66 |
| 2006/0117089 A1* | 6/2006 | Karam | ............. | H04L 1/22 709/208 |
| 2017/0271894 A1* | 9/2017 | York | ............. | H02J 7/0026 |
| 2017/0358914 A1* | 12/2017 | Chaiquin | ............. | H02H 3/063 |
| 2018/0090977 A1* | 3/2018 | Zhang | ............. | H02M 3/335 |

OTHER PUBLICATIONS

"IEEE P802.3bt/D3.0, Draft Standard for Ethernet Amendment: Power over Ethernet over 4 Pairs," LAN/MAN Standards Committee of the IEEE Computer Society, Jul. 20, 2017, 270 pp.
"IEEE Std 802.3-2015, Chapter 33: Data Terminal Equipment (DTE) Power via Media Department Interface (MDI)," IEEE Standard for Ethernet, Section Two, IEEE, Mar. 4, 2016, 93 pp.

* cited by examiner

*Primary Examiner* — Sai Aung
(74) *Attorney, Agent, or Firm* — Shumaker & Sieffert, P.A.

(57) ABSTRACT

A power sourcing equipment may provide fault detection, fault recovery, and redundancy in a Power over Ethernet system. The power sourcing equipment may apply voltage to an data port to transmit at least an amount of power requested by a powered device to the powered device over each of a plurality of pairs of wires of an data cable operably coupled to the data port. The power sourcing equipment may identify an occurrence of a fault in one or more pairs of wires out of the plurality of pairs of wires making up the data cable. The power sourcing equipment may, in response to identifying the occurrence of the fault, perform power recovery to supply the amount of power requested by the powered device to the powered device over a remaining one or more pairs of wires.

15 Claims, 6 Drawing Sheets

FAULT DETECTION AND POWER RECOVERY AND REDUNDANCY IN A POWER OVER ETHERNET SYSTEM

TECHNICAL FIELD

This disclosure relates to a power over ethernet system.

BACKGROUND

In a power over ethernet (PoE) system, a power sourcing equipment (PSE) may pass both data and power to a powered device (PD) via twisted pairs of wires of an Ethernet cable that communicatively couples the power sourcing equipment to the PD. In this way, the PSE can supply data and power to PDs, such as wireless access points, Internet Protocol (IP) cameras, Voice over IP (VOIP) phones, and other networked devices that may receive power and data over an Ethernet cable. Under the Institute of Electrical and Electronics Engineers (IEEE) 802.3af standard, a PSE can provide up to 15.4 Watts (W) of direct current (DC) power to a PD. Under the updated IEEE 802.3at standard, a PSE can provide up to 25.5 W of DC power to a PD.

SUMMARY

This disclosure describes techniques for recovering from a fault that occurs in data cables that carry, in a single cable, both data as well as power transmitted by a power sourcing equipment to a powered device. A power sourcing equipment may detect that it is connected to a powered device via a data cable. The powered device may negotiate with the power sourcing equipment to determine an amount of power that the power sourcing equipment transmits to the powered device and, in response, the power sourcing equipment may send data along with at least the negotiated amount of power to the powered device via the data cable. If a fault occurs in the data cable, the power sourcing equipment may be able to identify the pair of wires of the data cable at which the fault occurs out of a plurality of pairs of wires making up the data cable, and may recover from the fault to continue to transmit the negotiated amount of power to the powered device.

An Ethernet cable may be one example of the data cable that can carry both data and power from a power sourcing equipment to a powered device. In some examples, the power sourcing equipment may cause power to be transmitted via all four pairs of wires in an Ethernet cable operably coupled to an Ethernet port. When the power sourcing equipment identifies the pair of wires in the Ethernet cable at which the fault occurs, power sourcing equipment may increase the power transmitted in the remaining pairs of wires in the Ethernet cable to maintain the amount of power that is transmitted to the powered device. In other examples, the power sourcing equipment may cause the Ethernet cable to transmit more power to the powered device than was requested by the powered device. When a fault occurs at a pair of wires in the Ethernet cable, the remaining pairs of wires in the ethernet cable may continue to carry the amount of power originally requested by the powered device. In this manner, the techniques described in this disclosure may ensure that the powered device continues to receive the requested amount of power from the power sourcing equipment through the ethernet cable even if a fault occurs in the Ethernet cable.

The techniques described herein may provide certain advantages. For example, by transmitting power via all pairs of wires in the Ethernet cable, the power sourcing equipment may transmit a greater amount of power than by current power sourcing equipment. Further, by identifying the pair or pairs of wires in the Ethernet cable at which a fault has occurred, the power sourcing equipment may be able to notify an administrator when a fault has occurred in the Ethernet cable. Further, by detecting that a fault has occurred at a pair or wires in the Ethernet cable, the power sourcing equipment can quickly recover from the fault by transmitting the amount of power requested by the powered device in the remaining pairs of wires in the Ethernet cable. In this way, the powered device can recover from the fault more quickly (e.g., in milliseconds) to continue to operate normally without requiring downtime to replace the Ethernet cable, which may take days. In addition, by supplying twice the amount of power requested by the powered device via all of the wires of the Ethernet cable, the Ethernet cable may continuously supply the amount of power requested by the powered device even when a fault occurs in the Ethernet cable.

In one example, a method includes applying, by a power sourcing equipment, voltage to a data port to transmit at least an amount of power requested by a powered device to the powered device over a plurality of pairs of wires of a data cable operably coupled to the data port. The method further includes identifying, by a power sourcing equipment, an occurrence of a fault in one or more pairs of wires out of the plurality of pairs of wires making up the data cable. The method further includes in response to identifying the occurrence of the fault, performing, by the power sourcing equipment, power recovery to supply the amount of power requested by the powered device to the powered device over a remaining one or more pairs of wires.

In another example, a device includes a data port. The device further includes power supplying logic configured to: apply voltage to the data port to transmit at least an amount of power requested by a powered device to the powered device over a plurality of pairs of wires of a data cable operably coupled to the data port; identify an occurrence of a fault in one or more pairs of wires out of the plurality of pairs of wires making up the data cable; and in response to identifying the occurrence of the fault, perform power recovery to supply the amount of power requested by the powered device to the powered device over a remaining one or more pairs of wires.

In another example, a power sourcing equipment includes power supply logic configured to apply voltage to a data port to transmit at least an amount of power requested by a powered device to the powered device over one or more pairs of wires of a data cable operably coupled to the data port. The power sourcing equipment further includes fault detection logic configured to identify an occurrence of a fault in one or more pairs of wires out of the plurality of pairs of wires making up the data cable. The power supply logic is further configured to, in response to identifying the occurrence of the fault, perform power recovery to supply the amount of power requested by the powered device to the powered device over a remaining one or more pairs of wires.

The details of one or more techniques of the disclosure are set forth in the accompanying drawings and the description below. Other features, objects, and advantages of the techniques will be apparent from the description and drawings, and from the claims.

DETAILED DESCRIPTION

Figure 1:
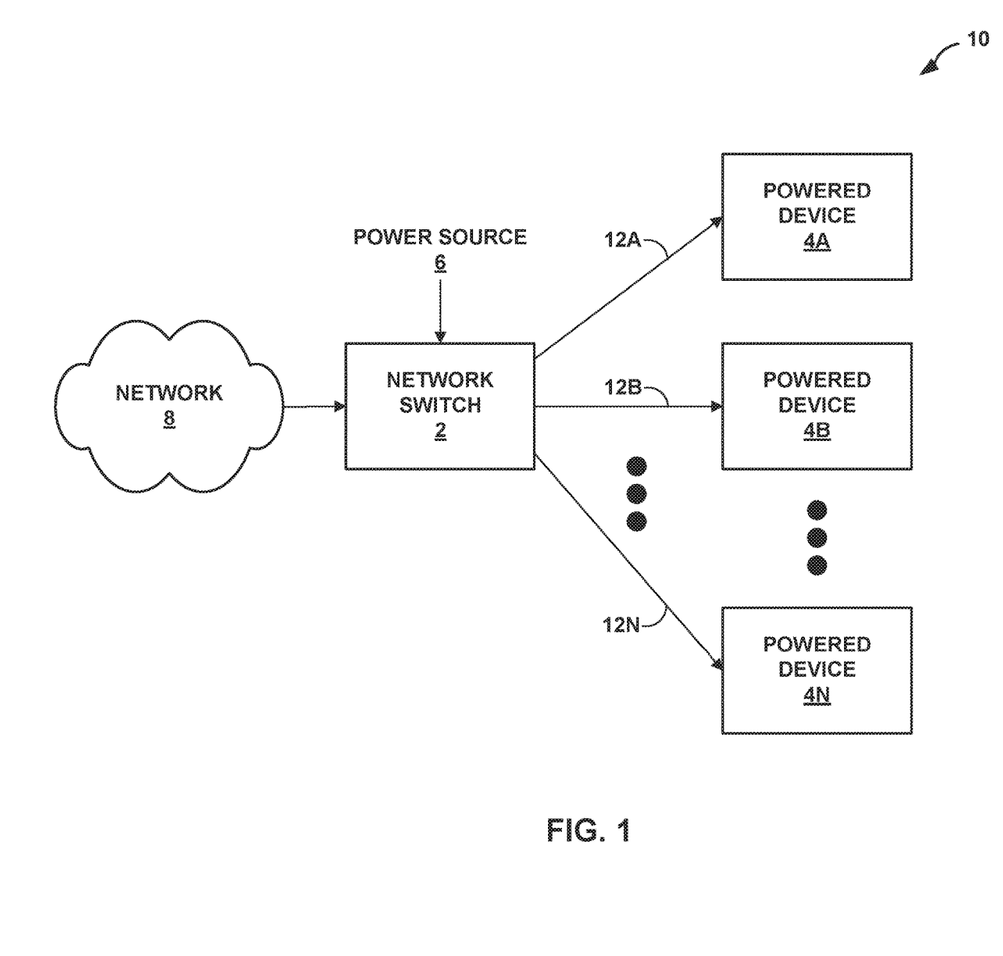
FIG. 1 is a block diagram illustrating power over ethernet (PoE) system.

FIG. 1 is a block diagram illustrating system 10. Examples of system 10 may include any system that is configured to transmit power via a communications cable that is also capable of carrying data. One example of system 10 is a Power over Ethernet (PoE) system that transmit power over Ethernet cables. As shown in FIG. 1, system 10 may include network switch 2 communicatively coupled to network devices 4A-4N ("network devices 4") via cables 12A-12N ("cables 12").

Cables 12 may carry data along with power between network switch 2 and network devices 4. In particular, cables 12 may carry both data and power between network switch 2 and network devices 4 at the same time. Examples of cables 12 may include Ethernet cables used as part of a PoE system. Network devices 4 may be any devices capable of receiving power and data from network switch 2 via cable 12, such as wireless access points, IP cameras, VOIP phones, and the like.

Network switch 2 may be configured to connect segments of a network. Network switch 2 may receive data (e.g., packets) from network 8, process the received data, such as by examining the packets, and forward the data in accordance with the routing information in the packets, to one or more of network devices 4 via cables 12. As used herein, the term "network switch" may broadly refer to any device used to connect network segments, such as a router, a switch, a hub, a repeater, and the like.

Besides routing data received from network 8 to network devices 4, network switch 2 may also include or act as power sourcing equipment of system 10 to transmit electrical power from power source 6 to one or more of network devices 4 via cables 12. Examples of power source 6 may include the electrical power grid, solar panels, batteries, an uninterruptible power supply, and the like. In this way, network switch 2 may both send data to and from network devices 4 and provide data to the network devices 4 via cables 12.

In accordance with some aspects of the present disclosure, a power sourcing equipment, such as network switch 2, may apply voltage to a data port to transmit at least an amount of power requested by a powered device (e.g., a powered device included in network devie 4A) to the powered device over a plurality of pairs of wires of a data cable (e.g., cable 12A) operably coupled to the data port. The power sourcing equipment may identify an occurrence of a fault in one or more pairs of wires out of the plurality of pairs of wires making up the data cable. The power sourcing equipment may, in response to identifying the occurrence of the fault, perform power recovery to supply the amount of power requested by the powered device to the powered device over a remaining one or more pairs of wires.

Figure 2:
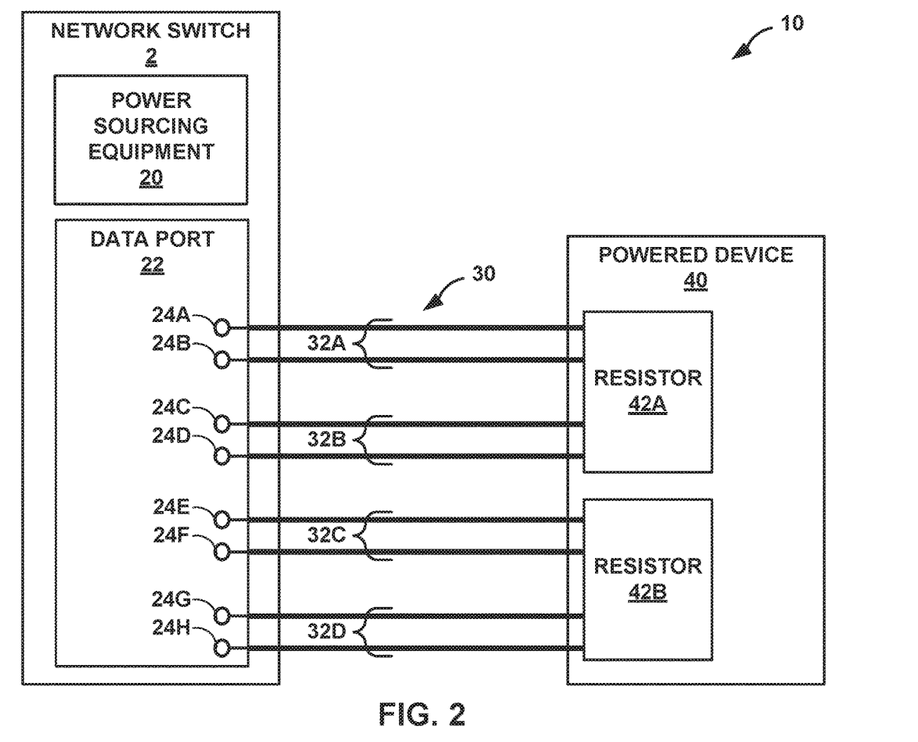
FIG. 2 is a block diagram illustrating the PoE system of FIG. 1 in further detail.

FIG. 2 is a block diagram illustrating the system 10 of FIG. 1 in further detail. As shown in FIG. 2, system 10 includes network switch 2 that is communicatively coupled to powered device 40 via data cable 30. Data port 22 of network switch 2 may be operable to accept a jack of data cable 30, in order to couple data cable 30 to network switch 2.

While one end of data cable 30 is operably coupled to data port 22 of network switch 2, the other end of data cable 30 may be operably coupled to a data port at or operably coupled to powered device 40. Powered devices 40 may be included in a network device (e.g., one of network device 4 of FIG. 1), and may be configured to receive data and power via data cable 30 for use by network device 4.

Examples of data cable 30 may include an Ethernet cable, and examples of data port 22 may include an Ethernet port. Data cable 30 may include a plurality of wires, where the plurality of wires may be made up of pairs of wires 32A-32D ("pairs of wires 32"). Each of the pairs of wires 32 may be a twisted pair of wires, and may also be referred to as twisted pairs or twisted pairs of wires. In one example, data cable 30 may include four pairs of wires 32A, 32B, 32C, and 32D for a total of eight wires. In other examples, data cable 30 may include more or fewer than four pairs of wires. For example, data cable 30 may use the four pairs of wires 32A-32D to carry power, while using additional pairs of wires for carrying data, or may use more or fewer than four pairs of wires to carry power. In some examples, each pairs of wires 32 of data cable 30 may carry both data and power to powered device 40 at the same time.

Network switch 2 may transmit electrical power along with data to powered device 40 via data cable 30. Typically, a PoE system may use two standards, referred to as Alternative A and Alternative B, for transmitting power over ethernet. When using either Alternative A or Alternative B, PoE systems typically transmits power over only two pairs of wires (e.g., pairs of wires 32A and 32B) out of the four pairs of wires (e.g., pairs of wires 32A, 32B, 32C, and 32D) included in an ethernet cable, such as data cable 30.

When data cable 30 is connected to data port 22, pairs of wires 32 of data cable 30 may be operably coupled or be in contact with pins 24A-24H ("pins 24") of data cable 30, so that each wire of the pairs of wires 32 is operably coupled to one of the pins 24. In the example of FIG. 2, data port 22 may include a pin for each wire of cable 32. For example, pair of wires 32A may be operably coupled to pins 24A and 24B of data cable 30. Pairs of wires 32B may be operably coupled to pins 24C and 24D of data cable 30. Pairs of wires 32C may be operably coupled to pins 24E and 24F of data cable 30. Pairs of wires 32D may be operably coupled to pins 24G and 24H of data cable 30.

To transmit electrical power via data cable 30 operably coupled to data port 22, power sourcing equipment 20 may apply a voltage to pins 24 of data port 22. By applying voltage to pins 24 of data port 22, data port 22 transmits power from pins 24, and causes pairs of wires 32 of data cable 30 to carry the transmitted power to powered device 40. For example, by applying a voltage to pins 24A and 24B, data port 22 transmits power from pins 24A and 24B, so that pair of wires 32A operably coupled to pins 24A and 24B of data port 22 carries the power transmitted by pins 24A and 24B to powered device 40.

Power sourcing equipment 20 of network switch 2 may be operably coupled to data port 22 and may be configured to manage and control data port 22's transmission of electrical power via data cable 30 to powered device 40. To initiate the transmission of electrical power to powered device 40, power sourcing equipment 20 may perform detection of whether a device connected via an ethernet cable (e.g., data cable 30) to data port 22 is capable of receiving power transmitted from data port 22.

To perform detection, power sourcing equipment 20 may probe for a valid powered device by sending out a probing voltage (e.g., between zero volts and two volts) via pins 24 of data port 22 to which data cable 30 is connected to detects a valid resistance. If power sourcing equipment 20 detects the valid resistance, then power sourcing equipment determines that a valid powered device is connected to data port 22 via data cable 30.

A valid powered device connected to network switch 2 (e.g., powered device 40) may detect the probing voltage and may, in response, connect a resistor with a signature resistance (e.g., between 19 kiloohms and 26.5 kiloohms) across the wires in data cable 30 that carried the power transmitted by power sourcing equipment 20. Such a resistance may be the valid resistance that power sourcing equipment 20 is attempting to detect. For example, powered device 40 may include resistor 42A and resistor 42B. Resistors 42A and 42B may each have a signature resistance (e.g., between 19 kiloohms and 26.5 kiloohms) as described above. Resistor 42A may be operably coupled at powered device 40 to pairs of wires 32A and 32B of data cable 30, and resistor 42B may be operably coupled at powered device 40 to pairs of wires 32C and 32D of data cable 30.

When power sourcing equipment 20 sends the probing voltage, power sourcing equipment 20 may apply the probing voltage to pins 24 of data port 22 that are operably coupled to fewer than all of the pairs of wires 32 in data cable 30. For example, power sourcing equipment 20 may apply the probing voltage to pins 24A-24D of data port 22 operably coupled to pairs of wires 32A and 32B. In response, power sourcing equipment 20 may detect the resistance of resistor 42A of powered device 40 that is operably coupled to pairs of wires 32A and 32B. Similarly, power sourcing equipment 20 may apply the probing voltage to pins 24E-24H of data port 22 operably coupled to pairs of wires 32C and 32D. In response, power sourcing equipment 20 may detect the resistance of resistor 42B of powered device 40 that is operably coupled to pairs of wires 32C and 32D.

When power sourcing equipment 20 detects the current at data port 22 resulting from placing the resistance across the power wires, such as by applying Ohm's law to the voltage sent via data port 22 and the detected current to determine the resistance placed across the wires in data cable 30, power sourcing equipment 20 may detect that powered device 40 is operably coupled to network switch 2 via data cable 30. Upon detection of powered device 40, power sourcing equipment 20 and powered device 40 may participate in a negotiation process so that powered device 40 can request an amount of power from power sourcing equipment 20.

In accordance with some aspects of the present disclosure, power sourcing equipment 20 may apply voltage to pins 24A-24H of data port 22 operably coupled to each of the pairs of wires 32 to send at least the amount of power requested by powered device 40 via all four pairs of wires 32 of data cable 30. In other words, power sourcing equipment 20 may cause each pair of wires of the plurality of pairs of wires 32 to carry at least a portion of the amount of power requested by powered device 40. This is in contrast to Alternative A and Alternative B described above, in which power sourcing equipment 20 directs the power source to send the amount of power requested by powered device 40 via only two pairs of wires 32 of data cable 30.

In some examples, power sourcing equipment 20 may equally divide the amount of power to be carried by data cable 30 over the four pairs of wires 32, so that a first two pairs of wires (e.g., pairs of wires 32A and 32B) may carry half of the amount of power requested by powered device 40, and a second two pairs of wires (e.g., pairs of wires 32C and 32D) may also carry half of the amount of power requested by powered device 40. For example, power sourcing equipment 20 may apply a first voltage to pins 24A-24D operably coupled to pairs of wires 32A and 32B to transmit half of the amount of power requested by powered device 40 over pairs of wires 32A and 32B, and may apply a second voltage to pins 24E-24H operably coupled to pairs of wires 32C and 32D to transmit half of the amount of power requested by powered device 40 over pairs of wires 32C and 32D.

In other examples, power sourcing equipment 20 may transmit the amount of power requested by powered device 40 via the first two pairs of wires, and also transmit the amount of power requested by powered device 40 via the second two pairs of wires. In this case, the first two pairs of wires may carry the total amount of power requested, and the second two pairs of wires may also carry the total amount of power requested. In other words, ethernet 30 may carry twice the amount of power requested by powered device 40. For example, power sourcing equipment 20 may apply a first voltage to pins 24A-24D operably coupled to pairs of wires 32A and 32B to transmit the full amount of power requested by powered device 40 over pairs of wires 32A and 32B, and may apply a second voltage to pins 24E-24H operably coupled to pairs of wires 32C and 32D to transmit the full amount of power requested by powered device 40 over pairs of wires 32C and 32D. Furthermore, powered device 40 may be configured so that it is able to receive twice the amount of power it has requested via wires 32A-D and is able to use all of the power transmitted over data cable 30.

As power is transmitted over data cable 30, power sourcing equipment 20 may detect faults in data cable 30 or at powered device 40. A fault in data cable 30 may be a fault that occurs at a pair of wires in data cable 30 that prevents the pair of wire from carrying power from power sourcing equipment 20 to powered device 40. A fault in cable 30 may occur as a result of physical damage (e.g., a cut in data cable 30) or any other form of damage. If a fault is detected in data cable 30, then data cable 30 may not be carrying the full amount of power requested by powered device 40. A fault at powered device 40 may prevent powered device 40 from receiving the power carried by data cable 30. For example, a fault at a data port (not shown) of powered device 40 may prevent powered device 40 from receiving power carried by one or more of pairs of wires 32 of data cable 30.

As pairs of wires 32 carry power from power sourcing equipment 20 to powered device 40, the first two pairs of wires 32A and 32B may act as a closed circuit and the second two pairs of wires 32C and 32D may also act as a closed circuit. Thus, to detect a fault in data cable 30 or powered device 40, power sourcing equipment 20 may detect whether an open circuit has occurred in the first two pairs of wires 32A and 32B or the second two pairs of wires 32C and 32D for a specified amount of time. An open circuit may occur if power sourcing equipment 20 is no longer able to detect a load (e.g., a resistance) across the pins 24 to which the two pairs of wires are operably coupled. As data cable 30 carries power via all four pairs of wires 32, resistors 42A and 42B may continue to provide resistance that may be detected by power sourcing equipment 20. Thus, if power sourcing equipment 20 can no longer detect the resistance provided by resistor 42A at pins 24A-24D, then power sourcing equipment 20 may determine that an open circuit has occurred in the first two pairs of wires 32A and 32B. Similarly, if power sourcing equipment 20 can no longer detect the resistance provided by resistor 42B at pins 24E-24H, then power sourcing equipment 20 may determine that an open circuit has occurred in the second two pairs of wires 32C and 32D.

As power sourcing equipment 20 transmits power via data cable 30 to powered device 40, if power sourcing equipment 20 detects an open circuit in two pairs of wires (e.g., pairs of wires 32A and 32B) for a specified amount of time (e.g., 100 milliseconds, 1 second, and the like), power source equipment 20 can determine that a fault has occurred in the two pairs of wires having the open circuit, or at pins of the data port of powered device 40 operably coupled to the two pairs of wires, and may identify the two pairs of wires having the open circuit as the pairs of wires at which a fault has occurred. Because two pairs of wires (e.g., pairs of wires 32A and 32B) together forms a closed circuit when power is transmitted via pairs of wires 32, a fault that occurs at a pair of wires (e.g., pair of wires 32A) causes two pairs of wires (e.g., pairs of wires 32A and 32B) that together forms a closed circuit to transition to an open circuit. Thus, even when the fault occurs only in one pair of wires out of two pairs of wires, power sourcing equipment 20 may nonetheless identify both pairs of wires as the two pairs of wires at which a fault has occurred. In response to determining that a fault has occurred in two pairs of wires of data cable 30, power sourcing equipment 20 may perform power recovery, so that powered device 40 is able to continue receiving the requested amount of power from power sourcing equipment 20.

If the amount of power requested by powered device 40 is transmitted over each of the first and second two pairs of wires, power sourcing equipment 20 may maintain the amount of power transmitted by the remaining two pairs of wires. Thus, power sourcing equipment 20 may maintain the amount of voltage and current applied to pins 24 operably coupled to the remaining two pairs of wires to maintain the amount of power transmitted by the remaining two pairs of wires. Power sourcing equipment 20 may also refrain from attempting to transmit power via the faulty two pairs of wires by refraining from applying voltage to pins 24 operably coupled to the fault two pairs of wires.

If the amount of power requested by powered device 40 is divided over the four pairs of wires 32, power sourcing equipment 20 may increase the amount of power being transmitted by the remaining two pairs of wires 32, so that the remaining two pairs of wires 32 carry the amount of power requested by powered device 40. Thus, power sourcing equipment 20 may increase the amount of current applied to pins 24 operably coupled to the remaining two pairs of wires to increase the amount of power being transmitted by the remaining two pairs of wires 32 to the amount of power requested by powered device 40. In this way, power sourcing equipment 20 may continue to transmit the requested amount of power to powered device 40 over ethernet 30 even when a fault occurs in two pairs of wires in data cable 30. Power sourcing equipment 20 may also refrain from attempting to transmit power via the faulty two pairs of wires by refraining from applying voltage to pins 24 operably coupled to the fault two pairs of wires.

Power sourcing equipment 20 may generate an alert to notify an administrator that such a fault has occurred in data cable 30. Power souring equipment 20 may send a message (e.g., an e-mail, text message) to an administrator, send a Simple Network Management Protocol (SNMP) trap to other computers to alert those computers of the fault in data cable 30, and the like.

Figure 3A:
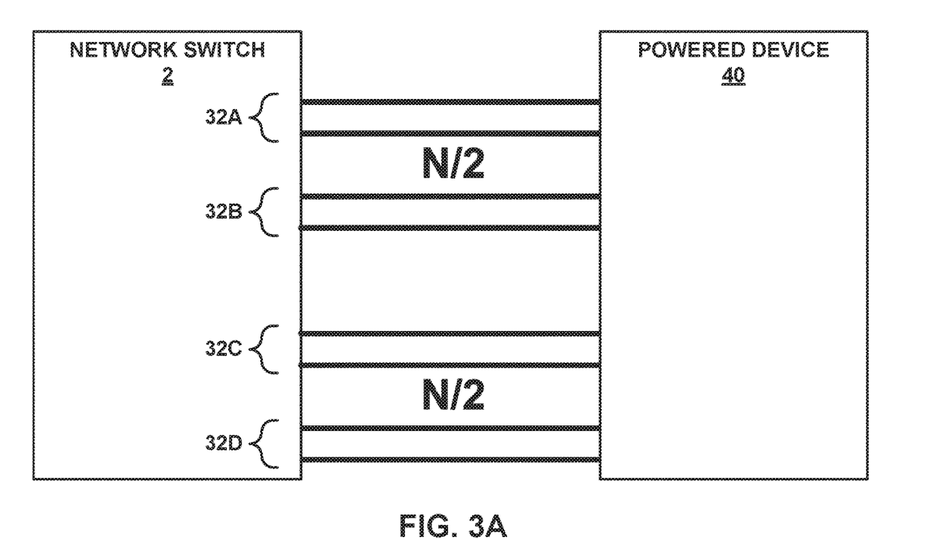
FIGS. 3A and 3B illustrate an example of power recovery in accordance with aspects of the present disclosure.

FIGS. 3A and 3B illustrate an example of power recovery in accordance with aspects of the present disclosure. As shown in FIG. 3A, power sourcing equipment 20 may send to powered device 40 the amount of power requested by powered device 40 via all four pairs of wires 32A-32D of data cable 30. For example, powered device 40 may request N watts of power from power sourcing equipment 20. In response, power sourcing equipment 20 may send N watts of power via all four pairs of wires 32A-32D to powered device 40 by applying the appropriate voltage to the pins 24 of data port 22. Power sourcing equipment 20 may send half the amount of power requested by powered device 40 (N/2 watts) via a first two pairs of wires 32A and 32B by applying the appropriate voltage to pins 24A-24D of data port 22, and may send half the amount of power requested (N/2 watts) via a second two pairs of wires 32C and 32D by applying the appropriate voltage to pins 24E-24H of data port 22.

Figure 3B:
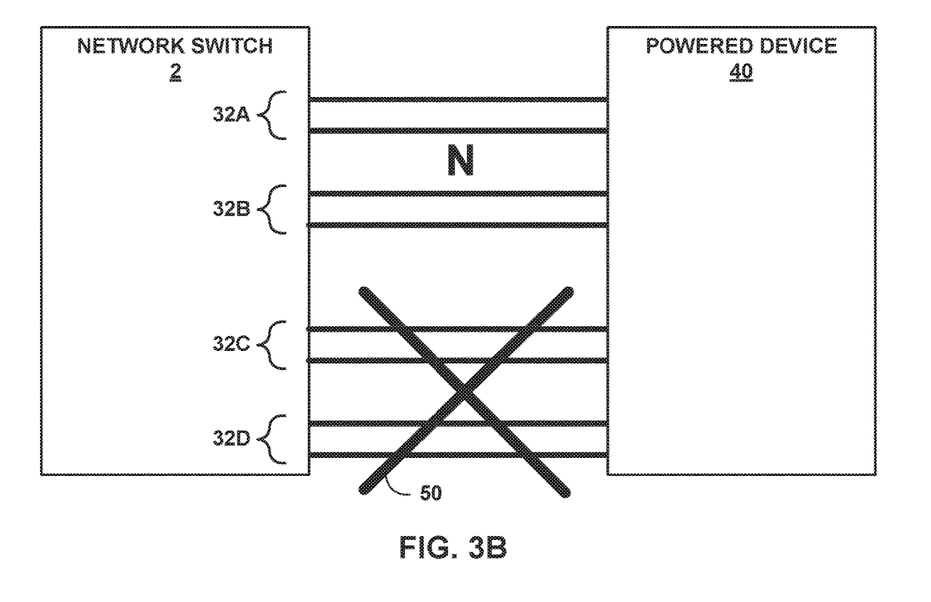

As shown in FIG. 3B, power sourcing equipment 20 may detect that fault 50 has occurred at the second two pairs of wires 32C and 32D. Thus, data cable 30, with fault 50, is only carrying half the amount of power requested by powered device 40 (N/2 watts) via the first two pairs of wires 32A and 32B. In response, power sourcing equipment 20 may perform power recovery to increase the amount of power carried by the first two pairs of wires 32A and 32B to the full amount of power requested by powered device 40 (N watts) by increasing the current applied to pins 24A-24D of ethernet port 24. In this way, power sourcing equipment 20 recovers from fault 50 that occurs in data cable 30 to deliver the full amount of power requested by powered device 40 even when fault 50 occurs in data cable 30.

Figure 4A:
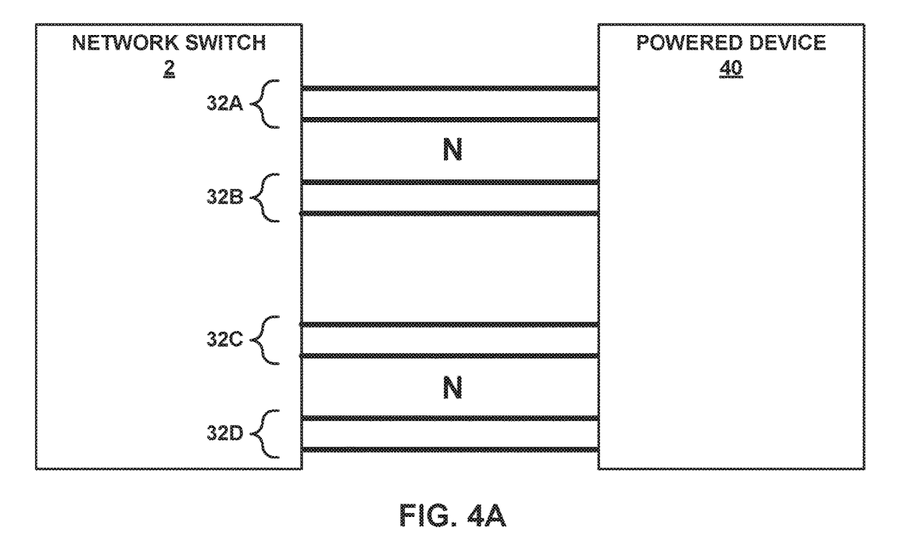
FIGS. 4A and 4B illustrate an example of power redundancy in accordance with aspects of the present disclosure.

FIGS. 4A and 4B illustrate an example of power redundancy in accordance with aspects of the present disclosure. As shown in FIG. 4A, power sourcing equipment 20 may send to powered device 40 more than the amount of power requested by powered device 40 via all four pairs of wires 32A-32D of data cable 30 by applying the appropriate voltage to pins 24 of data port 22. For example, powered device 40 may request N watts of power from power sourcing equipment 20. In response, power sourcing equipment 20 may send twice the amount of requested power (2N watts) via all four pairs of wires 32A-32D to powered device 40. Power sourcing equipment 20 may send the full amount of power requested by powered device 40 (N watts) via a first two pairs of wires 32A and 32B by applying the appropriate voltage to pins 24A-24D of data port 22, and may also send the full amount of power requested (N watts) via a second two pairs of wires 32C and 32D by applying the appropriate voltage to pins 24E-24H of data port 22.

Figure 4B:
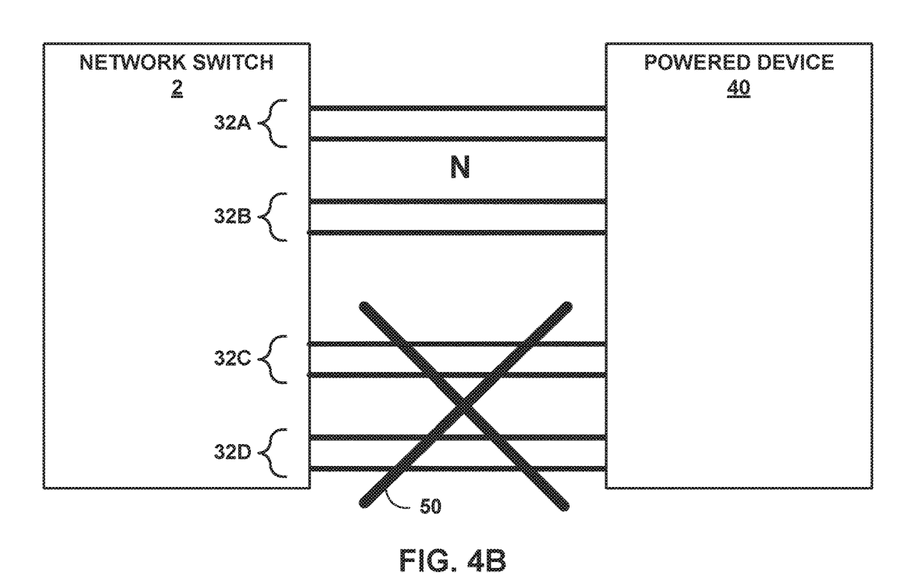

As shown in FIG. 4B, power sourcing equipment 20 may detect that fault 50 has occurred at the second two pairs of wires 32C and 32D. Because power sourcing equipment 20 sends twice the amount of power requested by powered device 40 via data cable 30 prior to fault 50, data cable 30, with fault 50, still carries the amount of power requested by powered device 40 (N watts) via the first two pairs of wires 32A and 32B. In response, power sourcing equipment 20 may maintain the amount of power carried by the first two pairs of wires 32A and 32B by maintaining the voltage applied to pins 24A-24D of data port 22, so that they continue to carry the full amount of power requested by powered device 40 (N watts). In this way, power sourcing equipment 20 delivers the full amount of power requested by powered device 40 even when fault 50 occurs in data cable 30.

Figure 5:
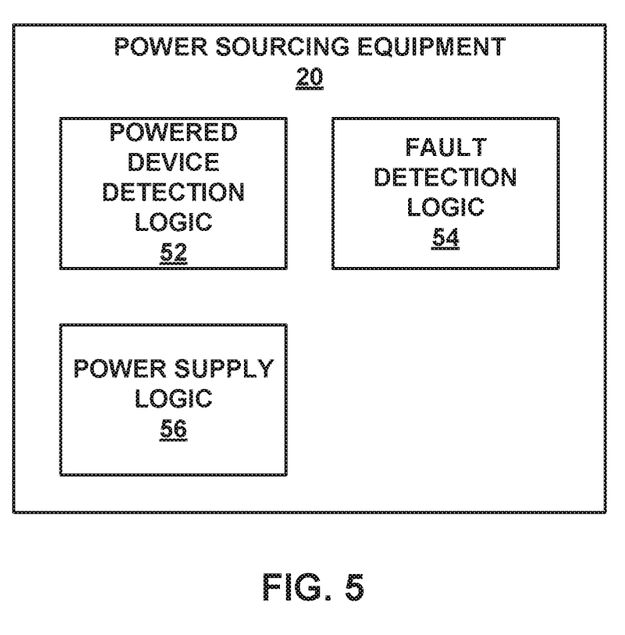
FIG. 5 illustrates the power sourcing equipment of FIG. 2 in further detail.

FIG. 5 illustrates power sourcing equipment 20 of FIG. 2 in further detail. As shown in FIG. 5, power sourcing equipment 20 may include powered device detection logic 52, fault detection logic 54, and power supply logic 56. Power sourcing equipment 20 may include powered device detection logic 52, fault detection logic 54, and power supply logic 56, in some examples, may be made up of processing circuitry, such as one or more digital signal processors (DSPs), general purpose microprocessors, application-specific integrated circuits (ASICs), field-programmable gate arrays (FPGAs), or other equivalent integrated or discrete logic circuitry. In some examples, powered device detection logic 52, fault detection logic 54, and power supply logic 56 may together be referred to as power supplying logic throughout this disclosure.

Power supply logic 56 may be operably coupled to power source 6 and to output power (e.g., voltage, current, etc.) to a data port (e.g., data port 22) of network switch 2. In some examples, power supply logic 56 may include a battery that stores power received from power source 6 and output the power stored in the battery to data port 22. In some examples, power supply logic 56 may convert power from alternating current (AC) power received from power source 6 into direct current (DC) power that is output to data port 22. In other examples, power supply logic 56 may receive DC power from power source 6 and may not need to convert the power received from power source 6 into DC power.

Powered device detection logic 52 may be configured to detect whether a powered device (e.g., powered device 40) capable of receiving power from power source equipment 20 is connected to a data port (e.g., data port 22) of network switch 2. Powered device detection logic 52 may direct power supply logic 56 to apply a probing voltage to the pins 24 of data port 22 and may detect whether there is a valid resistance at the pins of the data port 22 to which the probing voltage is applied. Powered device detection logic 52 may sense the voltage and the current at the pins 24 of the data port 22 to which the probing voltage is applied to determine the resistance via Ohms law. Powered device detection logic 52 may, in response to determining a valid resistance at the pins 24 of the data port 22, determine that a powered device capable of receiving power from power source equipment 20 is connected to data port 22.

When powered device detection logic 52 determines that a powered device capable of receiving power from power source equipment 20 is connected to data port 22, powered device detection logic 52 may negotiate with the powered device to determine the amount of power requested by the powered device. In response to determining the amount of power requested by the powered device, powered device detection logic 52 may send an indication of the amount of power requested to power supply logic 56.

In response to receiving from the powered device detection logic 52 the indication of the amount of power requested to power control logic 52, power supply logic 56 may direct power supply logic 56 to supply at least the amount of power requested by the powered device to data port 22. In response, power supply logic 56 may supply at least the amount of power requested by the powered device to data port 22, such as by applying a suitable amount of voltage and current to the appropriate pins of data port 22.

In particular, power supply logic 56 may apply voltage and current to each of the pins 24 of data port 22, so that power is transmitted via each of the four pairs of wires 32A-32D of data cable 30. In some examples, power supply logic 56 may apply voltage and current to the pins 24 of data port 22 to cause half of the amount of power requested by the powered device to be transmitted via a first two pairs of wires 32A and 32B, and to cause half of the amount of power requested by the powered device to be transmitted by a second two pairs of wires 32C and 32D. In other examples, power supply logic 56 may apply voltage and current to the pins 24 of data port 22 to cause the total amount of power requested by the powered device to be transmitted via the first two pairs of wires 32A and 32B, and to cause the total amount of power requested by the powered device to also be transmitted by the second two pairs of wires 32C and 32D.

Fault detection logic 54 may be configured to detect faults in an ethernet cable (e.g., data cable 30) connected to an ethernet port (e.g., data port 22) of network switch 2 as power supply logic 56 applies voltage to data port 22 to transmit the requested power to the powered device. In particular, fault detection logic 54 may sense the voltage and the current at the pins 24A-24D of data port 22 connected to the first two pairs of wires 32A and 32B to detect a resistance. When fault detection logic 54 does not detect the resistance, then fault detection logic 54 may detect that a fault has occurred at the first two pairs of wires 32A and 32B. Similarly, fault detection logic 54 may sense the voltage and the current at the pins 24E-24H of data port 22 connected to the second two pairs of wires 32C and 32D to detect a resistance. When fault detection logic 54 does not detect the resistance, then fault detection logic 54 may detect that a fault has occurred at the first two pairs of wires 32C and 32D.

When fault detection logic 54 detects a fault in data cable 30, fault detection logic 54 may store an indication of the fault status of data cable 30. Fault detection logic 54 may store such an indication of the fault status on a per-port basis in memory, so that the indication identifies the port (e.g., data port 22) at which there is a fault out of a plurality of ports of network switch 2. Fault detection logic 54 may store the indication of the fault status until the fault has been cleared. For example, the fault is cleared when fault detection logic 54 no longer detects a fault at an ethernet cable connected to data port 22, which may happen when an administrator replaces the faulty cable with a non-faulty cable.

When fault detection logic 54 detects a fault in data cable 30, fault detection logic 54 may also generate an alert. The alert may indicate that there is a fault in data cable 30, and may also include an indication of the two pairs of wires (e.g., first two pairs of wires 32A and 32B) that has the fault. Examples of the alert generated by fault detection logic 54 may include a SNMP trap, an e-mail, a text message, and the like.

When fault detection logic 54 detects a fault in data cable 30, fault detection logic 54 may also perform power recovery to ensure that the amount of power requested by the powered device continues to be sent via data port 22 and data cable 30. If half of the amount of power requested by the powered device is transmitted via the first two pairs of wires 32A and 32B, and half of the amount of power requested by the powered device is transmitted by the second two pairs of wires 32C and 32D, fault detection logic 54 may direct power supply logic 56 to supply the full amount of power requested by the powered device via the remaining two pairs of wires of data cable 30, such as by increasing the current applied to pins 24 operably coupled to the remaining two pairs of wires.

For example, if fault detection logic 54 detects a fault at the first two pairs of wires 32A and 32B, fault detection logic 54 may direct power supply logic 56 to supply the full amount of power requested by the powered device via the remaining second two pairs of wires 32C and 32D. Power supply logic 56 may, increase the current applied to pins 24E-24H of data port 22 connected to the second two pairs of wires 32C and 32D of data cable 30 to cause the full amount of power requested by the powered device to be supplied via the remaining second two pairs of wires 32C and 32D.

If the full amount of power requested by the powered device is transmitted via the first two pairs of wires 32A and 32B, and if the full amount of power requested by the powered device is also transmitted by the second two pairs of wires 32C and 32D, power supply equipment 20 may maintain its supply of the full amount of power requested by the powered device via the remaining two pairs of wires of data cable 30. Power supply logic 56 may maintain the voltage and current applied to pins 24E-24H of data port 22 operably coupled to the second two pairs of wires 32C and 32D to maintain the amount of power transmitted via the second two pairs of wires 32C and 32D.

When fault detection logic 54 detects a fault in data cable 30, fault detection logic 54 may also direct power supply logic 56 to cease applying voltage and current to pins 24 of data port 22 that are operably coupled to the faulty two pairs of wires (e.g., pins 24A-24D operably coupled to first two pairs of wires 32A and 32B, while maintaining the voltage and current applied to pins 24E-24H operably coupled to the second two pairs of wires 32C and 32D to maintain the amount of power transmitted via the second two pairs of wires 32C and 32D. In this way, power supplying equipment 20 may conserve power by not attempting to transmit power through faulty wires of data cable 30 when a fault is detected at those wires of data cable 30.

Figure 6:
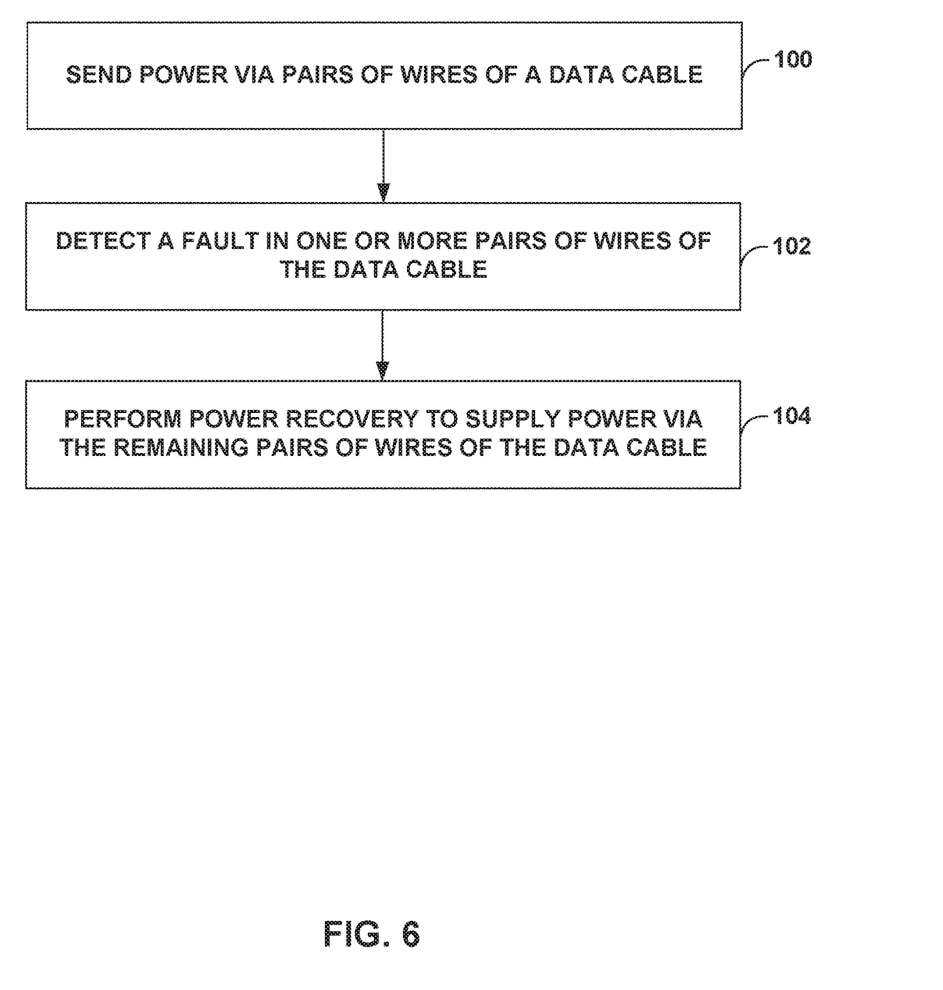
FIG. 6 is a flowchart illustrating an example operation of the power sourcing equipment of FIG. 2 in further detail.

FIG. 6 is a flowchart illustrating an example operation of the power sourcing equipment 20 of FIG. 2 in further detail. As shown in FIG. 6, power sourcing equipment 20 may apply a voltage to an data port 22 to transmit at least an amount of power requested by a powered device 40 to the powered device 40 over a plurality of pairs of wires 32 of an data cable 30 operably coupled to the data port 22 (100). Power sourcing equipment 20 may identify an occurrence of a fault in one or more pairs of wires out of the plurality of pairs of wires 32 making up the data cable 30 (102). Power sourcing equipment 20 may, in response to identifying the occurrence of the fault, perform power recovery to supply the amount of power requested by the powered device 40 to the powered device 40 over a remaining one or more pairs of wires (104).

In some examples, applying the voltage to the data port 22 may further include the power sourcing equipment 20 applying a first voltage to a first portion of pins 24A-24D of the data port 22 operably coupled to a first two pairs of wires 32A and 32B of the data cable 30 to transmit a first amount of power to the powered device 40 over the first two pairs of wires 32A and 32B of the data cable 30, and may further include the power sourcing equipment 20 applying a second voltage to a second portion of pins 24E-24H of the data port 22 operably coupled to a second two pairs of wires 32C and 32D of the data cable 30 to transmit a second amount of power to the powered device 40 over the second two pairs of wires 32C and 32D of the data cable 30.

In some examples, identifying the occurrence of the fault in the one or more pairs of wires out of the plurality of pairs of wires 32 making up the data cable 30 may further include the power sourcing equipment 20 identifying the occurrence of the fault at the first two pairs of wires 32A and 32B of the data cable 30 when the power sourcing equipment 20 identifies an open circuit at the first two pairs of wires 32A and 32B of the data cable 30 for at least a specified amount or period of time.

In some examples, applying the first voltage to the first portion of pins 24A-24D of the data port 22 to transmit the first amount of power to the powered device 40 over the first two pairs of wires 32A and 32B of the data cable 30 may further include the power sourcing equipment 20 applying the second voltage to the second portion of pins 24E-24H of the data port 22 to transmit half of the amount of power requested by the powered device 40 to the powered device 40 over the second two pairs of wires 32A and 32B of the data cable 30.

In some examples, applying the second voltage to the second portion of pins 24E-24H of the data port 22 to transmit the second amount of power to the powered device 40 over the second two pairs of wires 32C and 32D of the data cable 30 may further include the power sourcing equipment 20 applying the second voltage to the second portion of pins 24E-24H of the data port 22 to transmit half of the amount of power requested by the powered device 40 to the powered device 40 over the second two pairs of wires 32C and 32D of the data cable 30.

In some examples, performing power recovery to supply the amount of power required to the powered device 40 over the remaining one or more pairs of wires 32 may further include the power sourcing equipment 20 increasing the current applied to the second portion of pins 24E-24H of the data port 22 to transmit the amount of power requested by the powered device 40 to the powered device 40 over the second two pairs of wires 32C and 32D of the data cable 30.

In some examples, applying the first voltage to the first portion of pins 24A-24D of the data port 22 to transmit the first amount of power to the powered device 40 over the first two pairs of wires 32A and 32B of the data cable 30 may further include the power sourcing equipment 20 applying the second voltage to the second portion of pins 24E-24H of the data port 22 to transmit the amount of power requested by the powered device 40 to the powered device 40 over the second two pairs of wires 32C and 32D of the data cable 30.

In some examples, applying the second voltage to the second portion of pins 24E-24H of the data port 22 to transmit the second amount of power to the powered device 40 over the second two pairs of wires 32C and 32D of the data cable 30 may further include the power sourcing equipment 20 applying the second voltage to the second portion of pins 24E-24H of the data port 22 to transmit the amount of power requested by the powered device 40 to the powered device 40 over the second two pairs of wires 32C and 32D of the data cable 30, thereby providing power redundancy when the fault occurs at the first two pairs of wires 32A and 32B of the data cable 30.

In some examples, performing power recovery to supply the amount of power required to the powered device 40 over the remaining one or more pairs of wires 32 may further include the power sourcing equipment 20 maintaining the second voltage applied to the second portion of pins 24E-24H of the data port 22 to transmit the amount of power requested by the powered device 40 to the powered device 40 over the second two pairs of wires 32C and 32D of the data cable 30.

In some examples, in response to identifying the occurrence of the fault, the power sourcing equipment 20 may generate an alert that indicates the occurrence of the fault. In some examples, data port 22 may include an Ethernet cable, and data cable 30 may include an Ethernet cable.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
    applying, by a power sourcing equipment, voltage to a data port to transmit at least an amount of power requested by a powered device to the powered device over a plurality of pairs of wires of a data cable operably coupled to the data port, wherein applying the voltage to the data port further comprises:
        applying, by the power sourcing equipment, a first voltage to a first portion of pins of the data port operably coupled to a first two pairs of wires of the data cable to transmit a first amount of power to the powered device over the first two pairs of wires of the data cable; and
        applying, by the power sourcing equipment, a second voltage to a second portion of pins of the data port operably coupled to a second two pairs of wires of the data cable to transmit a second amount of power to the powered device over the second two pairs of wires of the data cable;
    identifying, by the power sourcing equipment, an occurrence of a fault in the first two pairs of wires out of the plurality of pairs of wires making up the data cable when the power sourcing equipment identifies an open circuit at the first two pairs of wires of the data cable for at least a specified amount of time; and
    in response to identifying the occurrence of the fault, performing, by the power sourcing equipment, power recovery to supply the amount of power requested by the powered device to the powered device over a remaining one or more pairs of wires.

2. The method of claim 1, wherein:
    applying the first voltage to the first portion of pins of the data port to transmit the first amount of power to the powered device over the first two pairs of wires of the data cable further comprises applying, by the power sourcing equipment, the first voltage to the first portion of pins of the data port to transmit half of the amount of power requested by the powered device to the powered device over the first two pairs of wires of the data cable; and
    applying the second voltage to the second portion of pins of the data port to transmit the second amount of power to the powered device over the second two pairs of wires of the data cable further comprises applying, by the power sourcing equipment, the second voltage to the second portion of pins of the data port to transmit half of the amount of power requested by the powered device to the powered device over the second two pairs of wires of the data cable.

3. The method of claim 2, wherein performing power recovery to supply the amount of power required to the powered device over the remaining one or more pairs of wires further comprises:
    increasing, by the power sourcing equipment, the second voltage applied to the second portion of pins of the data port to transmit the amount of power requested by the powered device to the powered device over the second two pairs of wires of the data cable.

4. The method of claim 1, wherein:
    applying the first voltage to the first portion of pins of the data port to transmit the first amount of power to the powered device over the first two pairs of wires of the data cable further comprises applying, by the power sourcing equipment, the first voltage to the first portion of pins of the data port to transmit the amount of power requested by the powered device to the powered device over the first two pairs of wires of the data cable; and
    applying the second voltage to the second portion of pins of the data port to transmit the second amount of power to the powered device over the second two pairs of wires of the data cable further comprises applying, by the power sourcing equipment, the second voltage to the second portion of pins of the data port to also transmit the amount of power requested by the powered device to the powered device over the second two pairs of wires of the data cable.

5. The method of claim 1, further comprising:
    in response to identifying the occurrence of the fault, generating, by the power sourcing equipment, an alert that indicates the occurrence of the fault.

6. The method of claim 1, wherein:
the data port comprises an Ethernet port; and
the data cable comprises an Ethernet cable.

7. A device comprising:
a data port; and
power supplying logic configured to:
apply voltage to the data port to transmit at least an amount of power requested by a powered device to the powered device over a plurality of pairs of wires of a data cable operably coupled to the data port, wherein to apply the voltage to the data port, the power supplying logic is further configured to:
apply a first voltage to a first portion of pins of the data port operably coupled to a first two pairs of wires of the data cable to transmit a first amount of power to the powered device over the first two pairs of wires of the data cable; and
apply a second voltage to a second portion of pins of the data port operably coupled to a second two pairs of wires of the data cable to transmit a second amount of power to the powered device over the second two pairs of wires of the data cable;
identify an occurrence of a fault in the first two pairs of wires out of the plurality of pairs of wires making up the data cable when the power supplying logic identifies an open circuit at the first two pairs of wires of the data cable for at least a specified amount of time; and
in response to identifying the occurrence of the fault, perform power recovery to supply the amount of power requested by the powered device to the powered device over a remaining one or more pairs of wires.

8. The device of claim 7, wherein:
the power supplying logic, when configured to apply the first voltage to the first portion of pins of the data port to transmit the first amount of power to the powered device over the first two pairs of wires of the data cable, is further configured to:
apply the first voltage to the first portion of pins of the data port to transmit half of the amount of power requested by the powered device to the powered device over the first two pairs of wires of the data cable; and
the power supplying logic, when configured to apply the second voltage to the second portion of pins of the data port to transmit the second amount of power to the powered device over the second two pairs of wires of the data cable, is further configured to:
apply the second voltage to the second portion of pins of the data port to transmit half of the amount of power requested by the powered device to the powered device over the second two pairs of wires of the data cable.

9. The device of claim 8, wherein the power supplying logic, when configured to perform power recovery to supply the amount of power required to the powered device over the remaining one or more pairs of wires, is further configured to:
increase the second voltage applied to the second portion of pins of the data port to transmit the amount of power requested by the powered device to the powered device over the second two pairs of wires of the data cable.

10. The device of claim 7, wherein:
the power supplying logic, when configured to apply the first voltage to the first portion of pins of the data port to transmit the first amount of power to the powered device over the first two pairs of wires of the data cable, is further configured to:
apply the first voltage to the first portion of pins of the data port to transmit the amount of power requested by the powered device to the powered device over the first two pairs of wires of the data cable; and
the power supplying logic, when configured to apply the second voltage to the second portion of pins of the data port to transmit the second amount of power to the powered device over the second two pairs of wires of the data cable, is further configured to:
apply the second voltage to the second portion of pins of the data port to transmit the amount of power requested by the powered device to the powered device over the second two pairs of wires of the data cable.

11. The device of claim 7, wherein the power supplying logic is further configured to:
in response to identifying the occurrence of the fault, generate an alert that indicates the occurrence of the fault.

12. The device of claim 7, wherein:
the data port comprises an Ethernet port; and
the data cable comprises an Ethernet cable.

13. A power sourcing equipment comprising:
power supply logic configured to apply voltage to a data port to transmit at least an amount of power requested by a powered device to the powered device over a plurality of pairs of wires of a data cable operably coupled to the data port, wherein applying the voltage to the data port further comprises:
applying a first voltage to a first portion of pins of the data port operably coupled to a first two pairs of wires of the data cable to transmit a first amount of power to the powered device over the first two pairs of wires of the data cable; and
applying a second voltage to a second portion of pins of the data port operably coupled to a second two pairs of wires of the data cable to transmit a second amount of power to the powered device over the second two pairs of wires of the data cable; and
fault detection logic configured to identify an occurrence of a fault in the first two pairs of wires out of the plurality of pairs of wires making up the data cable when the fault detection logic identifies an open circuit at the first two pairs of wires of the data cable for at least a specified amount of time;
wherein the power supply logic is further configured to, in response to identifying the occurrence of the fault, perform power recovery to supply the amount of power requested by the powered device to the powered device over a remaining one or more pairs of wires.

14. The power sourcing equipment of claim 13, wherein the power supplying logic, when configured to perform power recovery to supply the amount of power required to the powered device over the remaining one or more pairs of wires, is further configured to:
increase a second voltage applied to a second portion of pins of the data port to transmit the amount of power requested by the powered device to the powered device over a second two pairs of wires of the data cable operably coupled to the second portion of pins.

15. The power sourcing equipment of claim 13, wherein:
the data port comprises an Ethernet port; and
the data cable comprises an Ethernet cable.

\* \* \* \* \*